US008694679B2

(12) United States Patent
Sugai

(10) Patent No.: US 8,694,679 B2
(45) Date of Patent: Apr. 8, 2014

(54) CONTROL DEVICE, METHOD AND PROGRAM FOR DEPLOYING VIRTUAL MACHINE

(75) Inventor: Koji Sugai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 161 days.

(21) Appl. No.: 13/181,674

(22) Filed: Jul. 13, 2011

(65) Prior Publication Data

US 2012/0030349 A1 Feb. 2, 2012

(30) Foreign Application Priority Data

Jul. 28, 2010 (JP) ................................ 2010-169683

(51) Int. Cl.
*G06F 15/173* (2006.01)
(52) U.S. Cl.
USPC ............ 709/241; 709/203; 709/217; 709/238
(58) Field of Classification Search
USPC .................................. 709/203, 217, 238, 241
See application file for complete search history.

(56) References Cited

U.S. PATENT DOCUMENTS

| 6,985,937 | B1* | 1/2006 | Keshav et al. ................ 709/223 |
| 8,291,411 | B2* | 10/2012 | Beaty et al. ........................ 718/1 |
| 2002/0059427 | A1 | 5/2002 | Tamaki et al. |
| 2005/0108712 | A1* | 5/2005 | Goyal ............................ 718/100 |
| 2006/0184937 | A1* | 8/2006 | Abels et al. ........................ 718/1 |
| 2006/0230407 | A1* | 10/2006 | Rosu et al. ..................... 718/105 |
| 2007/0043860 | A1* | 2/2007 | Pabari ........................... 709/224 |
| 2010/0030877 | A1 | 2/2010 | Yanagisawa |

FOREIGN PATENT DOCUMENTS

| JP | 5-324361 A | 12/1993 |
| JP | 9-179667 A | 7/1997 |
| JP | 2002-024192 A | 1/2002 |
| JP | 2009-265778 | 11/2009 |
| WO | WO-2008-102739 A1 | 8/2008 |

OTHER PUBLICATIONS

Japanese Office Action mailed Jan. 28, 2014 for corresponding Japanese Application, with partial English-language translation.

* cited by examiner

*Primary Examiner* — Phuoc Nguyen
(74) *Attorney, Agent, or Firm* — Fujitsu Patent Center

(57) ABSTRACT

A control device includes a storage unit that stores a correspondence relationship between a first information processing device and attribute information of a first virtual machine provided by the first information processing device, and a correspondence relationship between a second information processing device and attribute information of a second virtual machine provided by the second information processing device; and a processor that refers to the storage unit and deploys a deployment object virtual machine to the first information processing device when the number of the first virtual machines with the same attributes as the attributes of the deployment object virtual machine among the first virtual machines provided by the first information processing device is detected to be fewer than the number of second virtual machines with the same attributes as the attributes of the deployment object virtual machine among the second virtual machines provided by the second information processing device.

18 Claims, 21 Drawing Sheets

FIG. 9

| VM NAME | CPU PERFORMANCE | CPU UTILIZATION RATE | CPU UTILIZATION AMOUNT | GROUP | RUNNING SERVER NAME |
|---|---|---|---|---|---|
| | GHz | % | GHz | | |
| VM 1 | 1.0 | 100.0 | 1.0 | OPERATION A | SERVER 1 |
| VM 2 | 1.0 | 80.0 | 0.8 | OPERATION B | SERVER 1 |
| VM 3 | 1.0 | 100.0 | 1.0 | OPERATION B | SERVER 2 |
| VM 4 | 1.0 | 70.0 | 0.7 | OPERATION C | SERVER 2 |
| VM 5 | 1.0 | 100.0 | 1.0 | OPERATION A | SERVER 3 |
| VM 6 | 1.0 | 40.0 | 0.4 | OPERATION C | SERVER 3 |
| VM 7 | 1.0 | 100.0 | 1.0 | OPERATION A | SERVER 4 |

| VM NAME | CPU PERFORMANCE GHz | CPU UTILIZATION RATE % | CPU UTILIZATION AMOUNT GHz | GROUP | RUNNING SERVER NAME |
|---|---|---|---|---|---|
| | | | | — | — |
| VM 1 | 1.0 | 100.0 | 1.0 | OPERATION A | SERVER 1 |
| VM 2 | 1.0 | 80.0 | 0.8 | OPERATION B | SERVER 1 |
| VM 3 | 1.0 | 100.0 | 1.0 | OPERATION B | SERVER 2 |
| VM 4 | 1.0 | 70.0 | 0.7 | OPERATION C | SERVER 2 |
| VM 5 | 1.0 | 100.0 | 1.0 | OPERATION A | SERVER 3 |
| VM 6 | 1.0 | 40.0 | 0.4 | OPERATION C | SERVER 3 |
| VM 7 | 1.0 | 100.0 | 1.0 | OPERATION A | SERVER 4 |
| VM 8 | 1.0 | 100.0 | 1.0 | OPERATION A | SERVER 2 |

1100

CPU UTILIZATION AMOUNT IS INCREASED

FIG. 13

| VM NAME | CPU PERFORMANCE GHz | CPU UTILIZATION RATE % | CPU UTILIZATION AMOUNT GHz | GROUP | RUNNING SERVER NAME |
|---|---|---|---|---|---|
| VM 1 | 1.0 | 100.0 | 1.0 | OPERATION A | SERVER 1 |
| VM 2 | 1.0 | 80.0 | 0.8 | OPERATION B | SERVER 1 |
| VM 3 | 1.0 | 100.0 | 1.0 | OPERATION B | SERVER 2 |
| VM 4 | 1.0 | 70.0 | 0.7 | OPERATION C | SERVER 4 |
| VM 5 | 1.0 | 100.0 | 1.0 | OPERATION A | SERVER 3 |
| VM 6 | 1.0 | 40.0 | 0.4 | OPERATION C | SERVER 3 |
| VM 7 | 1.0 | 100.0 | 1.0 | OPERATION A | SERVER 4 |
| VM 8 | 1.0 | 100.0 | 1.0 | OPERATION A | SERVER 2 |

1300

VM4 MOVES FROM SERVER 2 TO SERVER 4

| SERVER NAME | CPU PERFORMANCE | POWER STATE | CPU UTILIZATION RATE | CPU UTILIZATION AMOUNT |
|---|---|---|---|---|
| | GHz | — | % | GHz |
| SERVER 1 | 3.0 | ON | 60.0 | 1.8 |
| SERVER 2 | 3.0 | ON | 66.7 | 2.0 |
| SERVER 3 | 3.0 | ON | 46.7 | 1.4 |
| SERVER 4 | 3.0 | ON | 56.7 | 1.7 |

| VM NAME | CPU UTILIZATION AMOUNT | GROUP | RUNNING SERVER NAME |
|---|---|---|---|
| | GHz | — | — |
| VM1 | 1.0 | USER A | SERVER 1 |
| VM2 | 0.8 | USER B | SERVER 1 |
| VM3 | 1.0 | USER B | SERVER 2 |
| VM4 | 0.7 | USER C | SERVER 2 |
| VM5 | 1.0 | USER A | SERVER 3 |
| VM6 | 0.4 | USER C | SERVER 3 |
| VM7 | 1.0 | USER A | SERVER 4 |

CONTROL DEVICE, METHOD AND PROGRAM FOR DEPLOYING VIRTUAL MACHINE

CROSS-REFERENCE TO RELATED APPLICATIONS

This application is based upon and claims the benefit of priority of the prior Japanese Patent Application No. 2010-169683, filed on Jul. 28, 2010, the entire contents of which are incorporated herein by reference.

FIELD

The present invention relates to a control program, a control method, and a control device that controls a deployment of a virtual machine (VM).

BACKGROUND

Servers that provide VMs are used by thin clients and are used in cloud computing and the like.

Certain resources such as CPUs (central processing units) and memories are virtually allocated to VMs. However, the amount of resources that the VMs actually use changes according to the conditions of use of software such as operating systems (OS) and business applications running on the OS.

Accordingly, for example, the range of resource allocation that can be actually used by the VMs among the resources provided by the server is set. The range of resource allocation is called a "utilization range." Thus, the VMs are moved between servers so that the resources that the VMs actually use fall within the utilization range. Moreover, the number of running servers can be adjusted by activating or stopping servers as needed.

For example, VMs are collectively deployed in some servers and other servers are stopped when the utilization of resources actually used by the VMs drops below the utilization range. Conversely, new servers may be activated when the utilization of resources actually used by the VMs exceeds the utilization range. Then, migration is conducted to move VMs to the activated servers.

For example, it can be assumed that an information processing system 100 operates six VMs with virtually allocated CPUs each having an operating frequency of 1 GHz. FIG. 1 schematically illustrates CPU utilization rates of a VM 1 to a VM 6 with virtually allocated CPUs having operating frequencies of 1 GHz. A utilization rate 101 illustrated in FIG. 1 indicates that a VM 1 is operating a CPU with an operating frequency of 1 GHz at a utilization rate of 40%. Similarly, the utilization rates 102, 103, 104, 105, and 106 indicate that a VM2, a VM3, a VM4, a VM5, and a VM6 respectively are also operating CPUs with respective operating frequencies of 1 GHz at respective utilization rates of 40%.

The utilization rate of the information processing system 100 illustrated in FIG. 1 has a CPU with an operating frequency of 2 GHz and can be implemented by using three servers. The CPU utilization rate in this case is schematically illustrated in FIG. 2.

To simplify comparison with FIG. 1, the utilization rates 201 to 203 illustrated in FIG. 2 are based on utilization rates of CPUs with operating frequencies of 1 GHz. If the operating frequency is 2 GHz, the maximum utilization rate of servers 1 to 3 is 200% since the operating frequency is double the 1 GHz operating frequency. Utilization rates 301 to 302 illustrated in FIG. 3 and utilization rates 401 to 403 illustrated in FIG. 4 are the same as the above-mentioned utilization rates.

As illustrated in FIG. 2, the VM 1 and the VM 2 operate in the server 1, the VM 3 and the VM 4 operate in the server 2, and the VM 5 and the VM 6 operate in the server 3 to achieve the information processing system 100 illustrated in FIG. 1. The utilization rates 201, 202, and 203 of the corresponding servers 1, 2, and 3 at this time are 40% (=(40%+40%)÷200%×100%).

Moreover, the information processing system 100 illustrated in FIG. 2 can be achieved by using the two servers server 1 and server 2 by moving the VM 3 operating in server 2 to server 1, and by moving the VM 5 and the VM 6 operating in the server 3 to the server 2. In this case the server 3 can be stopped. The CPU utilization rate in this case is schematically illustrated in FIG. 3.

Moreover, the CPU utilization rate in the server 1 illustrated in FIG. 3 is 200% if the utilization rates of the VM 1 and the VM 2 operating in the server 1 illustrated in FIG. 3 both rise to 80% at the same time. In this case, the information processing system 100 illustrated in FIG. 2 can be achieved by using the three servers, server 1 to server 3, by activating the server 3 and moving the VM 2 to the server 3. The CPU utilization rate in this case is illustrated in FIG. 4.

Reducing the number of running servers to lower costs such as electricity costs by conducting the above processing to adjust the CPU utilization rate of the servers 1 to 3 to fall within a certain range is well known in the art.

Related to the above techniques, there is known a CPU control method that attempts to maintain a distribution ratio of specified CPU resources to effectively use real CPUs even when the CPU distribution is uneven in a virtual machine system that distributes CPU resources through the desired allocation of a plurality of virtual machines and runs the virtual machines (see, for example, Japanese Unexamined Patent Application Publication No. 05-324361).

Further, an information processor is known that attempts to effectively reduce the amount of power consumption of an entire computing system according to the usage conditions of real resources (see, for example, Japanese Unexamined Patent Application Publication No. 09-179667).

Further, a computing apparatus resource allocation device is known that allocates independent computing resources for user enterprises and automatically changes the allocation according to loads in real time in a data center (see, for example, Japanese Unexamined Patent Application Publication No. 2002-024192).

However, when the utilization range is set at a low level, the effect of cost reduction is small since the number of running servers cannot be reduced very much. Moreover, when the utilization range is set to a high level, unused resources in the servers are reduced. In this case, there may not be sufficient resources for other VMs to use when the resources used by VMs increase dramatically. As a result, the comparable performance for resources such as CPUs and memories allocated to VMs cannot be obtained. If a Service Level Agreement (SLA) that guarantees a certain quality is established, such performance may be in opposition to the SLA.

SUMMARY

According to an aspect of an embodiment, a control device includes a storage unit that stores a correspondence relationship between a first information processing device and attribute information of a first virtual machine provided by the first information processing device, and a correspondence relationship between a second information processing device and attribute information of a second virtual machine provided by the second information processing device; and a processor that refers to the storage unit and deploys a deployment object virtual machine to the first information processing device when the number of the first virtual machines with attributes that are the same as the attributes of the deployment object virtual machine among the first virtual machines provided by the first information processing device is detected to be fewer than the number of second virtual machines with attributes that are the same as the attributes of the deployment object virtual machine among the second virtual machines provided by the second information processing device.

The object and advantages of the embodiment will be realized and attained by at least the features, elements, and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is a specific example of a VM table according to the second embodiment.

FIG. 11 illustrates the VM table when the CPU utilization rate of the VM 8 conducting the operation A has increased to 100%.

FIG. 13 illustrates the VM table when a VM 4 that operates on the server 2 is moved to the server 4.

FIG. 21 illustrates a VM table when VMs use users according to VM group classifications.

DESCRIPTION OF EMBODIMENTS

Examples of the present embodiments will be described herein with reference to FIGS. 5 to 21. The embodiments described herein are merely examples and may include various modifications and technical applications not described herein. That is, the present embodiments may be implemented in various forms including combinations of parts of embodiments or entire embodiments without departing from the spirit of the invention.

Embodiment 1

Figure 1:
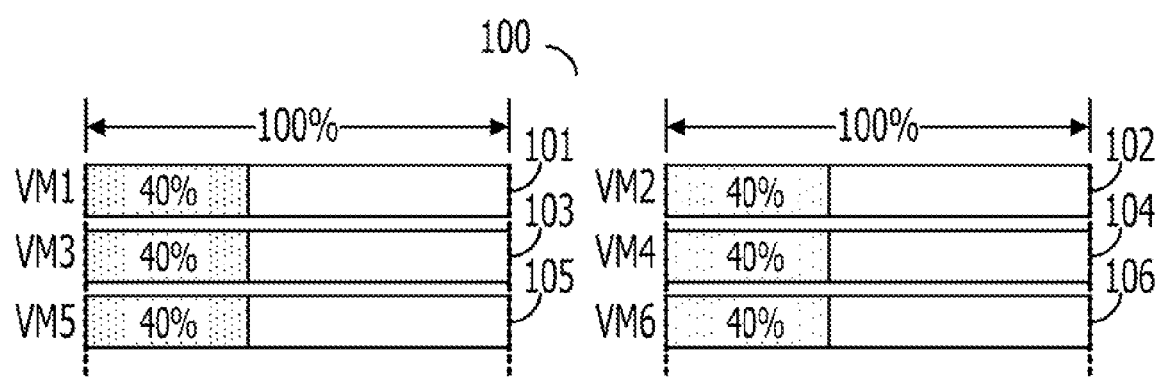
FIG. 1 schematically illustrates CPU utilization rates of VM1 to VM6 having virtually allocated CPUs with operating frequencies of 1 GHz.
Figure 2:
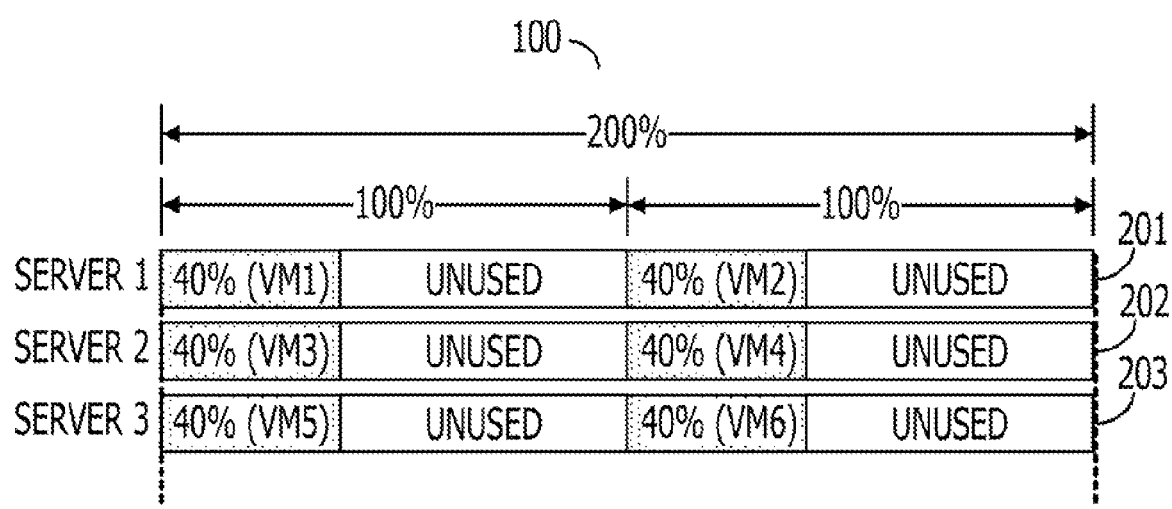
FIG. 2 schematically illustrates a CPU utilization rate for achieving the information processing system with the CPU utilization rate illustrated in FIG. 1 when using three servers each having an operating frequency of 2 GHz.
Figure 3:
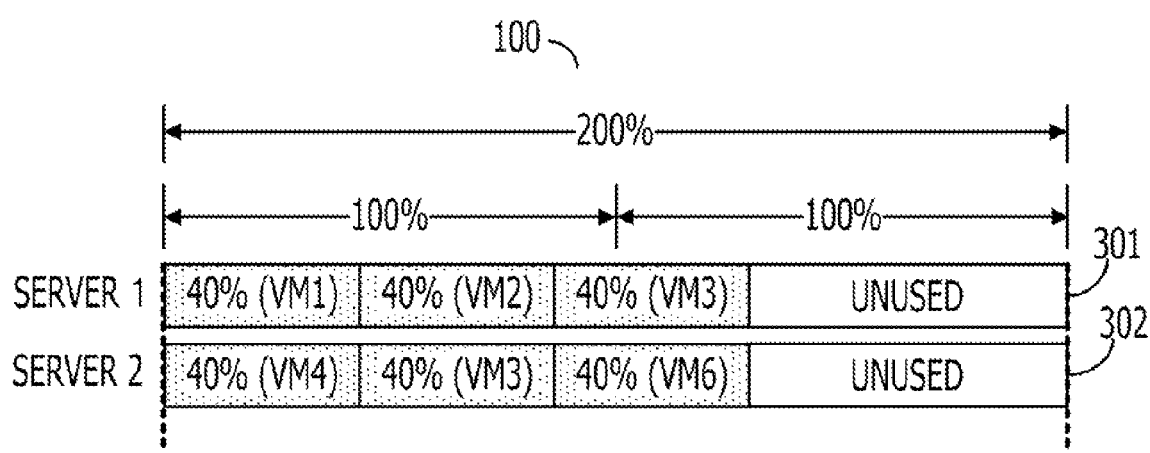
FIG. 3 schematically illustrates a CPU utilization rate for achieving the information processing system illustrated in FIG. 2 when using two servers.
Figure 4:
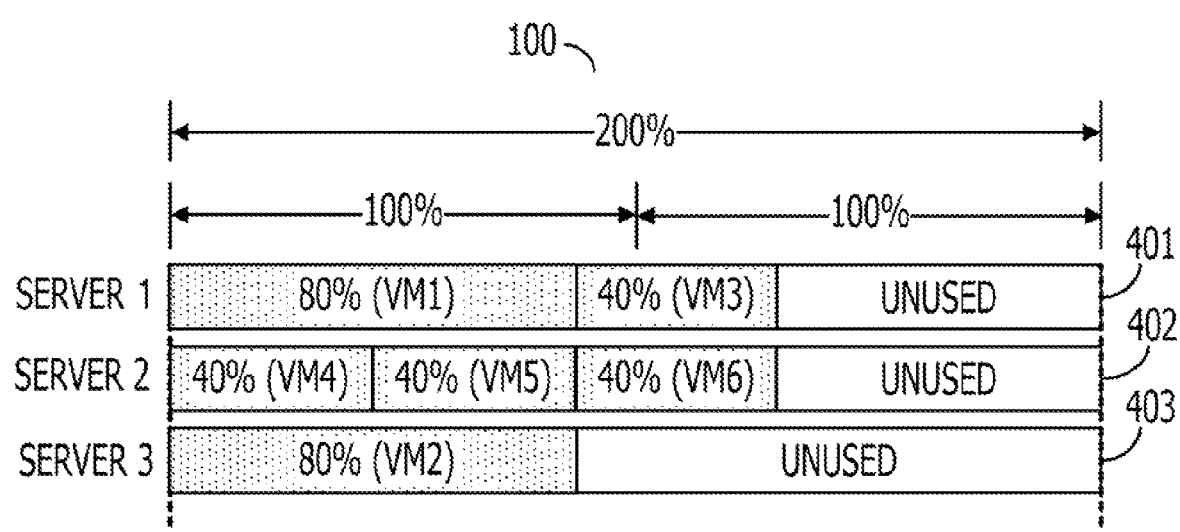
FIG. 4 schematically illustrates a CPU utilization rate for achieving the information processing system illustrated in FIG. 3 when using server 1 to server 3 by reactivating the stopped server 3 and moving a VM 2 to the server 3.
Figure 5:
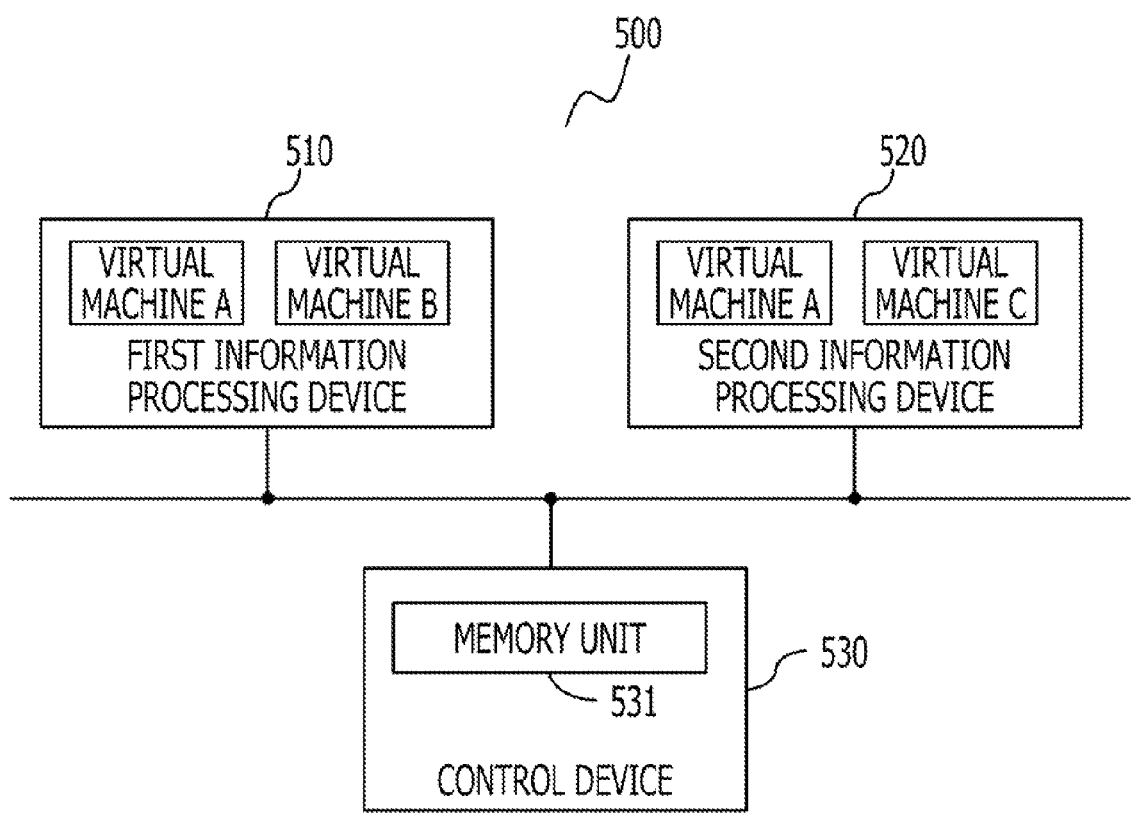
FIG. 5 illustrates an information processing system using a control device according to a first embodiment.

FIG. 5 illustrates an information processing system 500 using a control device 530 according to a first embodiment.

The information processing system 500 includes a first information processing device 510, a second information processing device 520, and a control device 530. The first information processing device 510, the second information processing device 520, and the control device 530 are communicably interconnected through a network or dedicated wiring.

The first information processing device 510 and the second information processing device 520 can be implemented by general information processors that include constituent elements, such as CPUs and memories, necessary for conducting information processing.

The first information processing device 510 and the second information processing device 520 execute certain programs to provide one or two or more virtual machines according to program commands. Certain resources are virtually allocated to the virtual machines.

The term "resources" here indicates resources that are used by information processors to conduct information processing. Parts of or all of hardware necessary for information processing such as CPUs, memories, magnetic disk devices, and input/output devices for networks may be used as resources.

FIG. 5 illustrates an example of the first information processing device 510 providing a virtual machine A and a virtual machine B. Further, FIG. 5 illustrates an example of the second information processing device 520 providing a virtual machine A and a virtual machine C.

The virtual machines A provided by the first information processing device 510 and the second information processing device 520 are virtual machines with the same attributes according to attribute information to be described below.

However, the virtual machines provided by the first information processing device 510 and the second information processing device 520 are merely examples and do not limit the configuration of the information processing system 500 using the control device 530.

The control device 530 is a device that controls the first information processing device 510 and the second information processing device 520. Similar to the first information processing device 510 and the like, the control device 530 can be implemented by general information processors that include constituent elements, such as CPUs and memories, necessary for conducting information processing. The control device 530 implements controls related to the present embodiment by conducting certain programs. Moreover, the control device 530 has a memory unit 531.

The memory unit 531 stores a correspondence relation between the first information processing device 510 and the attribute information of virtual machines, for example, virtual machine A and virtual machine B illustrated in FIG. 5, provided by the first information processor 510. Similarly, the memory unit 531 stores a correspondence relation between the second information processing device 520 and the attribute information of virtual machines, for example, virtual machine A and virtual machine C illustrated in FIG. 5, provided by the second information processing device 520.

The attribute information indicates attributes belonging to the virtual machines, for example the virtual machines A, B, and C illustrated in FIG. 5, provided by the first information processing device 510 and the second information processing device 520. Attributes, such as the purpose of usage of a virtual machine, the network used by a virtual machine, the user who uses the virtual machine, and the like, indicating the same or similar trends of fluctuations of loads on information processing are used in the attribute information.

The control device 530 refers to the memory unit 531 that stores the correspondence relation between the first information processing device 510 and the attribute information of the virtual machines provided by the first information processing device 510, as well as the correspondence relation between the second information processing device 520 and the attribute information of the virtual machines provided by the second information processing device 520.

The control device 530 then detects that the number of virtual machines with the same attributes as the attributes of virtual machines for deployment among the virtual machines provided by the first information processing device 510 is fewer than the number of virtual machines with the same attributes as the attributes of virtual machines for deployment among the virtual machines provided by the second information processing device 520. In this case, the control device 530 deploys the virtual machines for deployment to the first information processing device 510.

Here the term "deploy" includes adding a new virtual machine for deployment to the first information processing device 510, and moving a virtual machine for deployment on the second information processing device 520 to the first information processing device 510.

In the example in FIG. 5, the number of virtual machines with the same attributes as the virtual machine C among the virtual machines provided by the first information processing device 510 is fewer than the number of virtual machines with the same attributes as the virtual machine C among the virtual machines provided by the second information processing device 520. Therefore, the control device 530 adds the virtual machine C to the first information processing device 510.

As described above, when the control device 530 detects fewer virtual machines with the same attributes as the attributes of virtual machines for deployment among the virtual machines provided by the first information processing device 510 than the number of virtual machines with the same attributes as the attributes of virtual machines for deployment among the virtual machines provided by the second information processing device 520, the control device 530 deploys a virtual machine for deployment to the first information processing device 510.

As a result, the number of virtual machines with the same attributes can be reduced so that the number of virtual machines having the same or similar trends in fluctuations in information processing loads can also be reduced. Therefore, a sudden increase in loads in the information processing device can be avoided when the loads of many virtual machines increase at the same time. As a result, a reduction in usable resources of virtual machines due to an increase in the loads of some of the other virtual machines can be avoided. Thus, the virtual machines can use the allocated resources without limitation and demonstrate performance comparable to the allocated resources.

Embodiment 2

Figure 6:
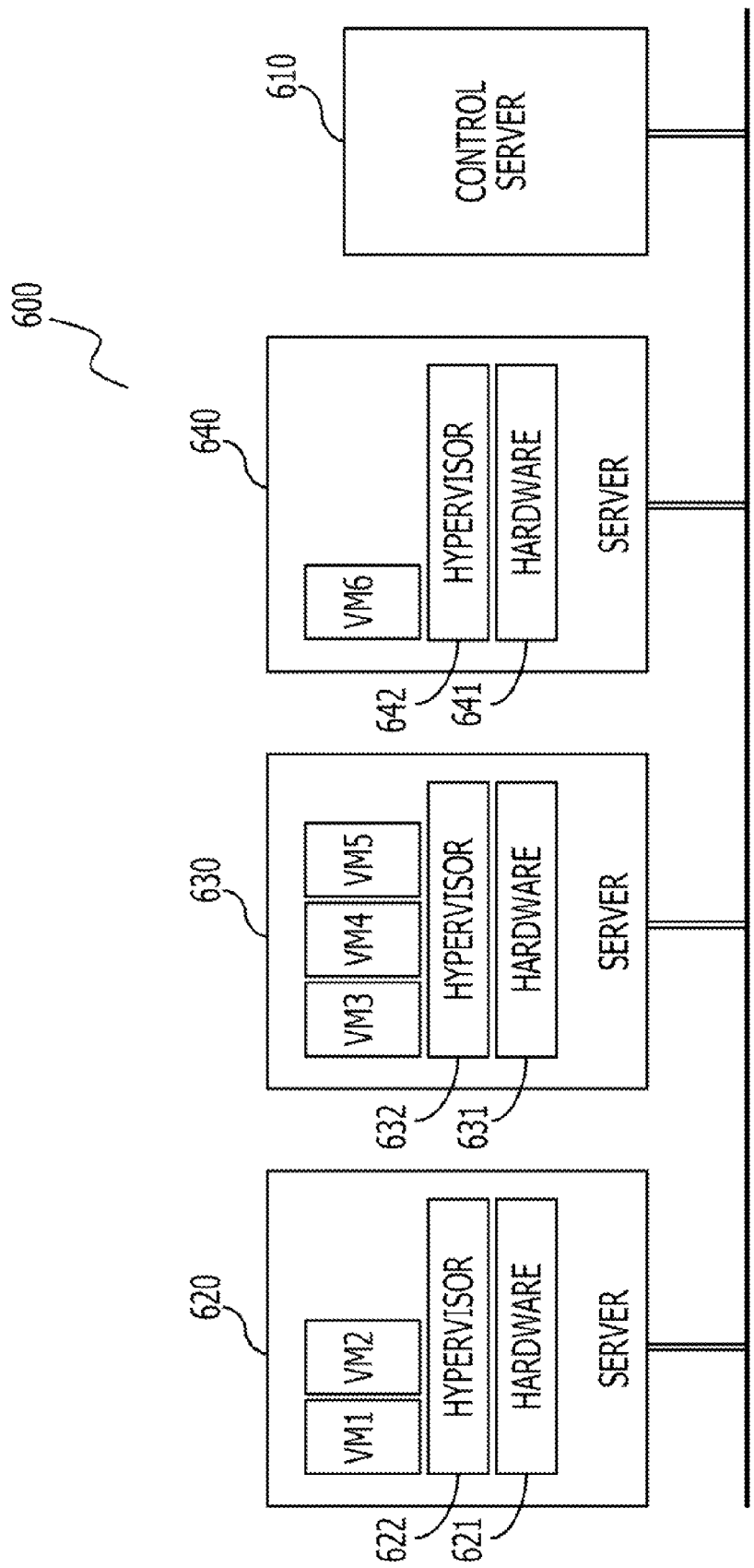
FIG. 6 illustrates an exemplary configuration of an information processing system using a control server according to a second embodiment.

FIG. 6 illustrates an exemplary configuration of an information processing system 600 using a control server 610 according to the present embodiment.

The information processing system 600 includes the control server 610, and servers 620, 630, and 640. The control server 610 and the servers 620, 630, and 640 are communicably interconnected through a network or dedicated wiring.

The control server 610 adds VMs to the servers 620, 630, and 640 based on the operation of a user.

Furthermore, the control server 610 monitors the loads on the servers 620, 630, and 640 during information processing. The control server 610 moves the VMs operating on the servers and activates and stops servers so that the loads on the servers 620, 630, and 640 are within a previously set utilization range.

The server 620 includes hardware 621 such as a CPU and memory necessary for information processing. The server 620 also includes a hypervisor 622 in addition to the hardware 621. The hypervisor 622 is a program that implements a VM with certain virtually allocated resources. The example in FIG. 6 illustrates a VM 1 and a VM 2 operating under the hypervisor 622.

Similarly, the server 630 includes hardware 631. The server 630 also includes a hypervisor 632 in addition to the hardware 631. The example in FIG. 6 illustrates a VM 3, a VM 4, and a VM 5 operating under the hypervisor 632. Similarly, the server 640 includes hardware 641. The server 640 also includes a hypervisor 642 in addition to the hardware 641. The example in FIG. 6 illustrates a VM 6 operating under the hypervisor 642.

The control server 610 and the servers 620, 630, and 640 are implemented by hardware configurations included in general information processors. A detailed example of a configuration of the control server 610 is described below with reference to FIG. 19.

Furthermore, although the information processing system 600 exemplified in FIG. 6 includes three servers, the number of servers controlled by the control server 610 is not limited to this number.

Figure 7:
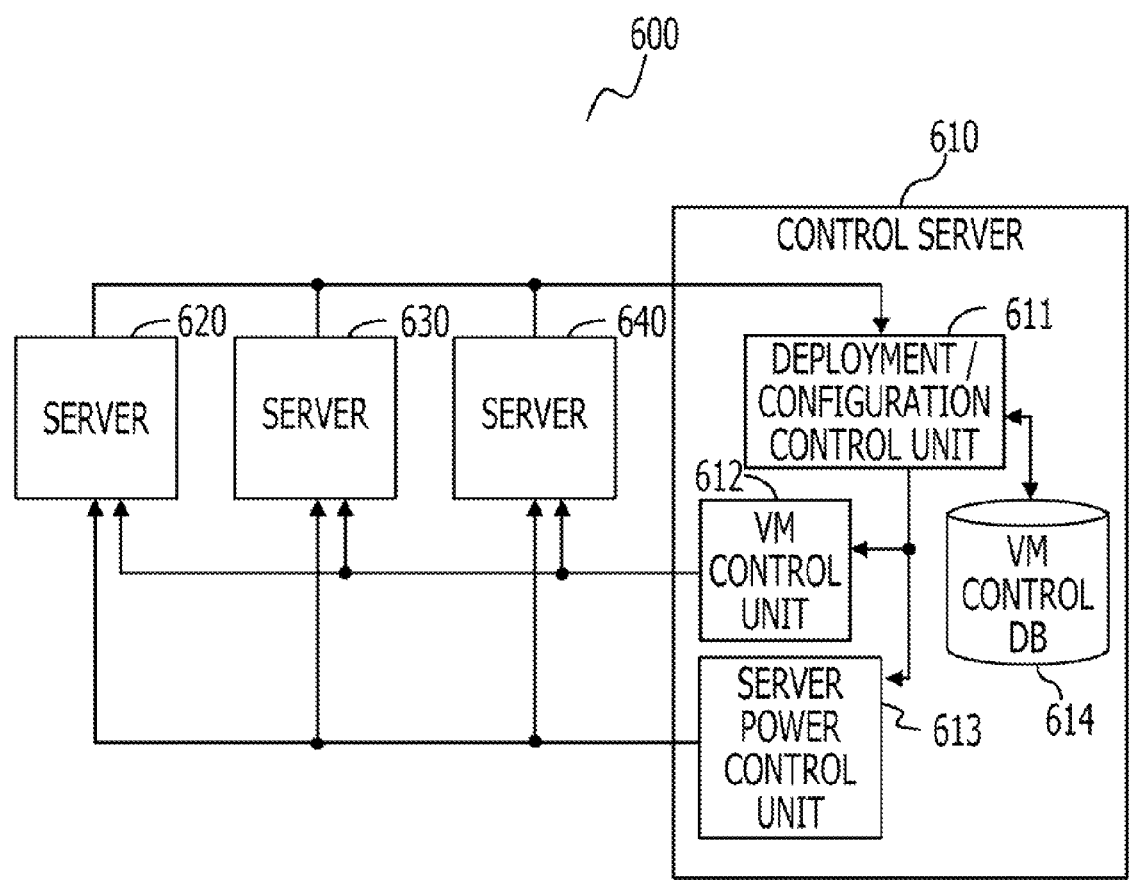
FIG. 7 illustrates an exemplary configuration of a control server according to the second embodiment.

FIG. 7 illustrates an exemplary configuration of a control device 610 according to the present embodiment.

The control server 610 includes a deployment/configuration control unit 611, a VM control unit 612, a server power control unit 613, and a VM control DB (database) 614.

The deployment/configuration control unit 611 periodically obtains load information indicating the loads of the servers from the servers 620, 630, and 640. A CPU utilization rate is used as the load information in the example described in the present embodiment.

A ratio of how long resources are being used in units of time is an example how the "utilization rate" may be used. In this case, the CPU utilization rate is a ratio of how long the CPU is occupied in a certain unit of time. However, a suitable utilization rate that is defined as needed may be used.

When an instruction to add a new VM is received from the user, the deployment/configuration control unit 611 selects a server to add the VM thereto from the servers 620, 630, and 640. The deployment/configuration control unit 611 then instructs the VM control unit 612 to activate a new VM on the selected server.

If the deployment/configuration control unit 611 detects a server with a CPU utilization rate lower than the lower limit of the previously set utilization range, the deployment/configuration control unit 611 selects a destination among the servers 620, 630, and 640 for the VMs operating on the detected server. The deployment/configuration control unit 611 then instructs the VM control unit 612 to move all of the VMs operating on the server with the CPU utilization rate below the lower limit of the previously set utilization range, to the selected server. When the VMs operating on the server are removed due to moving the VMs, the deployment/configuration control unit 611 instructs the server power control unit 613 to stop the server in which the removed VMs had been operating.

If the deployment/configuration control unit 611 detects a server with a CPU utilization rate higher than the upper limit of the previously set utilization range, the deployment/configuration control unit 611 selects a destination among the servers 620, 630, and 640 for the VM operating on the detected server. The deployment/configuration control unit 611 then instructs the VM control unit 612 to move the VM with the lowest load among the VMs operating on the server with the CPU utilization rate above the upper limit of the previously set utilization range, to the selected server. However, moving the VM is not limited to moving the VM with the lowest load, and one or more of any of the VMs may be selected and moved. The reason for moving the VM with the lowest load is to control the loads on the servers when moving the VMs and to reduce the utilization rate of the servers. If there is no destination server to move the VM to, the deployment/configuration control unit 611 instructs the server power control unit 613 to activate a stopped server. Then the deployment/configuration control unit 611 instructs the VM control unit 612 to move the VM to the activated server.

The VM control unit 612 instructs servers to activate new VMs based on instructions from the deployment/configuration control unit 611. Moreover, the VM control unit 612 instructs the servers to perform migration of the VMs between the servers based on instructions from the deployment/configuration control unit 611.

The server power control unit 613 instructs the servers to stop or to become activated on the basis of instructions from the deployment/configuration control unit 611.

The VM control DB 614 is a storage device that stores at least a server table 800 that contains information related to servers, and a VM table 900 that contains information related to VMs. The server table 800 and the VM table 900 are illustrated in FIGS. 8 and 9 respectively.

The examples illustrated in the present embodiment use the CPU utilization rate of the servers as load information. However, the present embodiment is not limited as such. For example, a CPU load average that indicates an average number of processes waiting for execution or a memory utilization rate and the like may be used as load information that indicates loads on servers due to information processing.

The arrows illustrated in FIG. 7 indicate the flow of data between the servers 620, 630, and 640 and the deployment/configuration control unit 611, the VM control unit 612, and the server power control unit 613. Therefore, FIG. 7 is not intended to illustrate a different configuration than the configuration in FIG. 6.

Figure 8:
FIG. 8 is a specific example of a server table according to the second embodiment.

FIG. 8 is a specific example of a server table 800 according to the present embodiment.

The server table 800 contains information on CPU performance, power state, CPU utilization rate, and CPU utilization amount for each server.

The "CPU performance" is information indicating the CPU performance capability of the server. In the present embodiment, CPU operating frequency is used as the CPU performance.

The "power state" is information that indicates the power state of the server, e.g., whether the server power is on or off. The off state may include a reduced power state or a suspended state of the server.

The "CPU utilization rate" is information that indicates a ratio of how long a CPU is occupied in units of time.

The "CPU utilization amount" is information obtained from the following formula (1).

$$\text{CPU utilization amount} = \text{CPU performance} \times \text{CPU utilization rate} \div 100 \qquad (1)$$

The CPU performance illustrated in FIG. 8 is described as 3.0 GHz for all the servers to allow for easier description. However, the CPU performance is not limited to 3.0 GHz. Similarly, the below-mentioned server table 1200 and server table 1400 are similarly not limited to the described CPU performance of 3.0 GHz.

FIG. 9 is a specific example of a VM table 900 according to the present embodiment.

The VM table 900 contains information on CPU performance, CPU utilization rate, CPU utilization amount, group, and running server name for each VM.

The "CPU performance" is information indicating the information processing capability of a CPU virtually allocated to a VM. In the present embodiment, the CPU operating frequency is used as the CPU performance in the same way as in FIG. 8.

The "CPU utilization rate" is information that indicates the occupancy ratio in units of time of a CPU virtually allocated to a VM.

The "CPU utilization amount" is information obtained from the formula (1).

The "group" refers to information that indicates the group to which the VM is classified based on the work being used. The example illustrated in FIG. 9 indicates that the VM 1, the VM 5, and the VM 7 form a group being used for an operation A. Similarly, the example illustrated in FIG. 9 indicates that the VM 2 and the VM 3 form a group being used for an operation B, and the VM 4 and the VM 6 form a group being used for an operation C.

The "running server name" is identification information that identifies the server in which the VM is operating.

In the present embodiment, the groups illustrated in FIG. 9 use attribute information that indicates the attribute belonging to the VMs. VMs having the same attributes tend to have the same or similar fluctuations in information processing loads. Therefore, operating VMs with the same attributes on the same server may lead to a dramatic rise in the load. As a result, VMs with the same attributes may be distributed and operated among different servers.

In the present embodiment, the CPU performance of the CPUs virtually allocated to the VMs is 1.0 GHz. Hence, the CPU performance figures illustrated in FIG. 9 are all 1.0 GHz. The CPU performance is described as such for the ease of description. The CPU performance of the CPUs virtually allocated to the VMs is not limited to 1.0 GHz. Similarly, CPU performance in the below-mentioned VM tables 1000, 1100, and 1300 of the CPUs virtually allocated to the VMs is not limited to 1.0 GHz.

Moreover, although the present embodiment uses operations conducted by the VMs as attribute information, the present embodiment is not limited as such. Common information that indicates the same or similar trends in the fluctuation of information processing loads may be used as the attribute information as necessary. For example, the networks described in FIG. 20 or the users described in FIG. 21 may be used as the attribute information. For example, the number of cores in the CPUs, the number of threads, the type of architecture, the capacities of an L2 cache and L3 cache, the bus speed, the types of memories used, or a performance score derived from a certain standard may also be used as attribute information.

Figure 10:
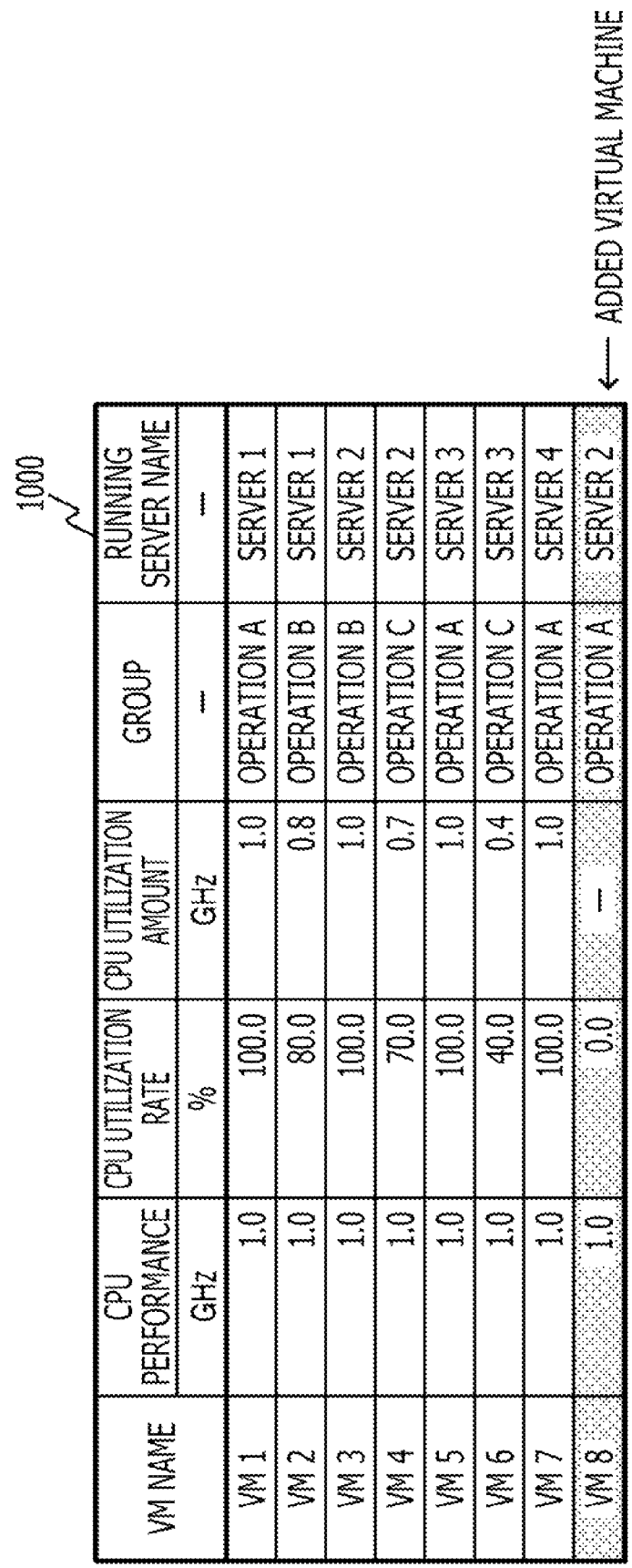
FIG. 10 illustrates the VM table with a VM 8 conducting an operation A added to the server 2.

FIG. 10 illustrates a VM table 1000 when the VM 8 that conducts operation A is added to the server 2 based on the state of the VM table 900. After the addition, the CPU utilization amount of the VM 8 becomes 0 GHz since the CPU utilization rate of the VM 8 is 0%.

Figure 12:
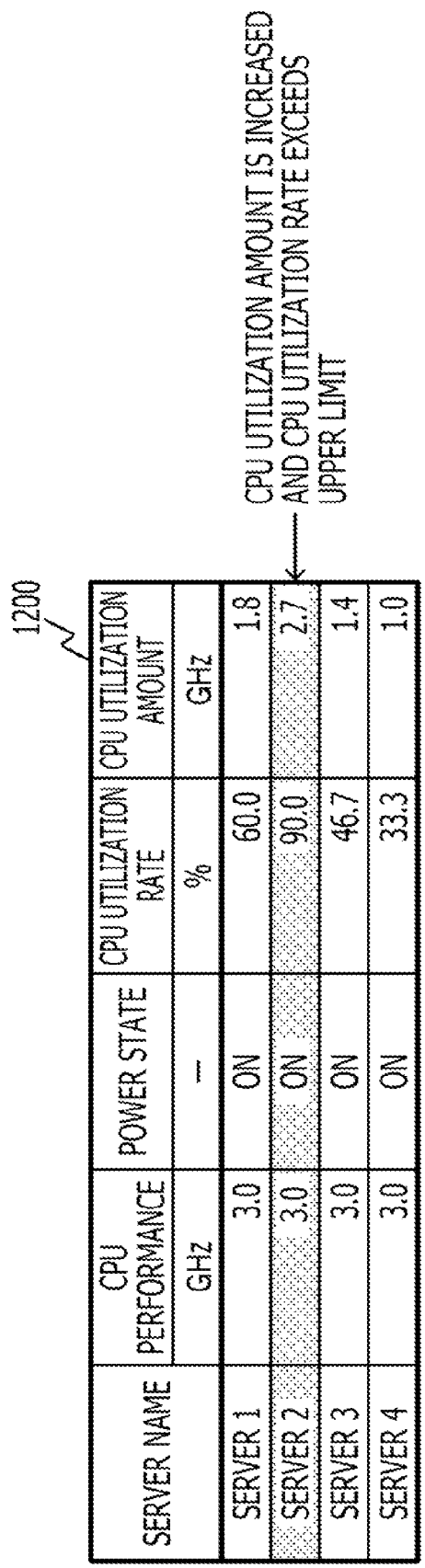
FIG. 12 illustrates the server table when the CPU utilization rate of the VM 8 conducting operation A has increased to 100%.

FIG. 11 illustrates a VM table 1100 when the CPU utilization rate of the VM 8 conducting operation A increases to 100%, that is the CPU utilization amount increases to 1.0 GHz from the previous state indicated in the VM table 1000. FIG. 12 illustrates a server table 1200 in the state indicated by the VM table 1100.

When the CPU utilization amount of the VM 8 increases to 1.0 GHz, the total of the CPU utilization amounts of the VM 3, the VM 4, and the VM 8 operating on the server 2 amounts to 2.7 GHz. Hence, the CPU utilization amount of the server 2 becomes 2.7 GHz as illustrated in FIG. 12. Similarly, the CPU utilization rate of the server 2 rises to 90%.

Figure 14:
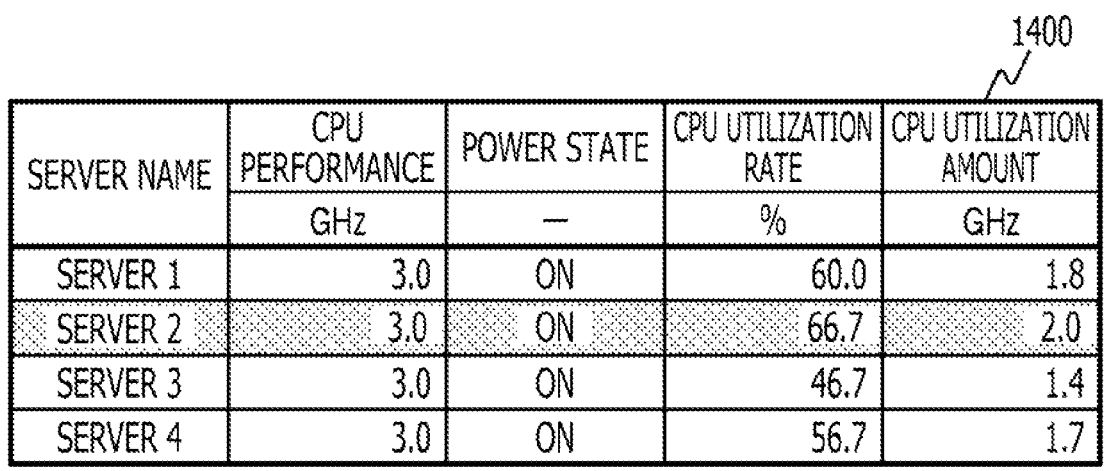
FIG. 14 illustrates the server table when the VM 4 that operates on the server 2 is moved to the server 4.

FIG. 13 illustrates a VM table 1300 which indicates that the VM 4 operating on the server 2 has been moved to the server 4 from the previous condition indicated in the VM table 1100. FIG. 14 illustrates a server table 1400 in the state indicated by the VM table 1300.

After the VM 4 migrates from the server 2 to the server 4, the only VMs left operating on the server 2 are the VM 3 and the VM 8. In this case, the total of the CPU utilization amounts of the VM 3 and the VM 8 amount to 2.0 GHz. Hence, the CPU utilization amount of the server 2 becomes 2.0 GHz as illustrated in FIG. 14. The CPU utilization rate of the server 2 is reduced to 66.7%.

After the VM 4 moves from the server 2 to the server 4, the VMs operating on the server 4 are the VM 4 and the VM 7. The total of the CPU utilization amounts of the VM 4 and the VM 7 is 1.7 GHz. Hence, the CPU utilization amount of the server 4 becomes 1.7 GHz as illustrated in FIG. 14. The CPU utilization rate of the server 4 is increased to 56.7%.

Figure 15:
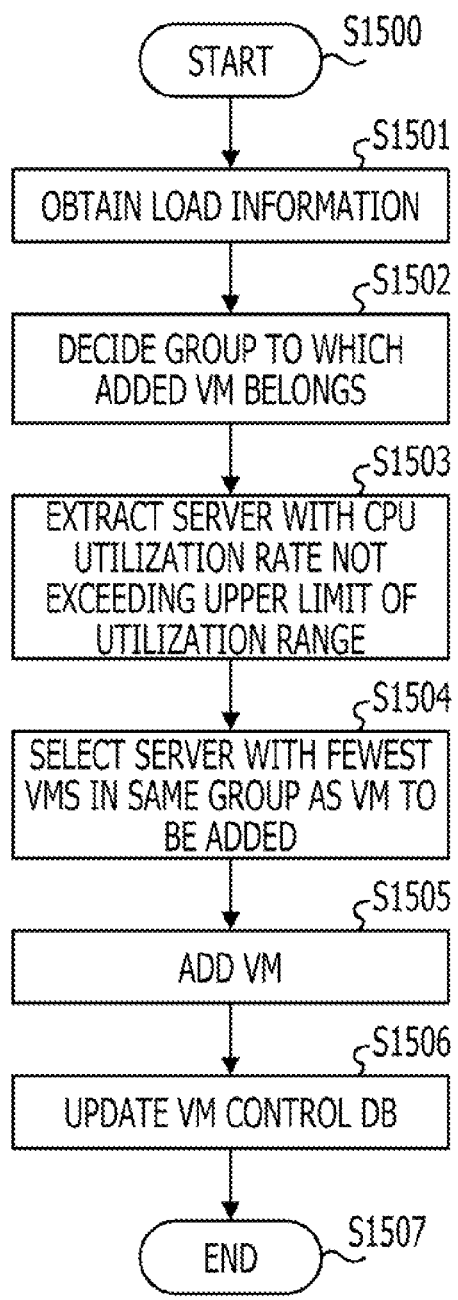
FIG. 15 is a flow chart illustrating VM addition processing according to the second embodiment.

FIG. 15 is a flow chart illustrating VM addition processing according to the present embodiment.

When an instruction to add a new VM is received from a user, the control server 610 starts the following VM addition processing (step S1500).

In step S1501, the control server 610 obtains load information from each server, for example, from the servers 620, 630, and 640 illustrated in FIG. 6. The load information includes two types of load information. One type of load information indicates the CPU related to the server such as, for example, the CPU utilization rate illustrated in FIG. 8. This type of load information is called "CPU load information." The other type of load information indicates the CPUs virtually allocated to the VMs operating on the servers such as, for example, the CPU utilization rate illustrated in FIG. 9. This type of load information is called "VM load information."

The control server 610 stores the obtained CPU load information in the server table 800. The control server 610 also stores the obtained VM load information in the VM table 900.

In step S1502, the control server 610 decides to which group the added VM belongs. For example, the control server 610 decides that the group to which the added VM belongs is a group for an operation specified by the user.

In step S1503, the control server 610 refers to the server table 800 to extract a server with a CPU utilization rate that does not exceed the upper limit of the utilization range. The extracted server then becomes a candidate server to receive the VM.

In the present embodiment, the utilization range is assumed to be 20% to 80% as an example. For example, the CPU utilization rates of the servers 1 to 4 are all within 20% to 80% as indicated in the server table 800. In this case, the control server 610 extracts the servers 1 to 4 as candidate servers for receiving the VM.

In step S1504, the control server 610 refers to the VM table 900 to select the server with the fewest VMs in the same group as the group decided in step S1502, from among the servers extracted in step S1503.

For example, if the group to receive the VM decided in step S1502 is the operation A group, the control server 610 selects the server with the fewest VMs belonging to the operation A group.

The VM table 900 indicates that the VM 1 belonging to the operation A group is running on server 1. The VM 5 belonging to the operating group A is running on server 3. The VM 7 belonging to the operating group A is running on server 4. Conversely, there is no VM belonging to the operation A group running on the server 2. In this case, the control server 610 selects the server 2 from among the servers 1 to 4 extracted in step S1503.

In step S1505, the control server 610 adds the VM. For example, the control server 610 sends an instruction to add the new VM to the server selected in step S1504. The server that receives the instruction then activates a new VM.

In step S1506, the control server 610 updates the VM control DB 614. For example, when the VM 8 is added to the server 2, the control server 610 updates the VM table 900 stored in the VM control DB 614 to reflect the VM table 1000 illustrated in FIG. 10.

Figure 16:
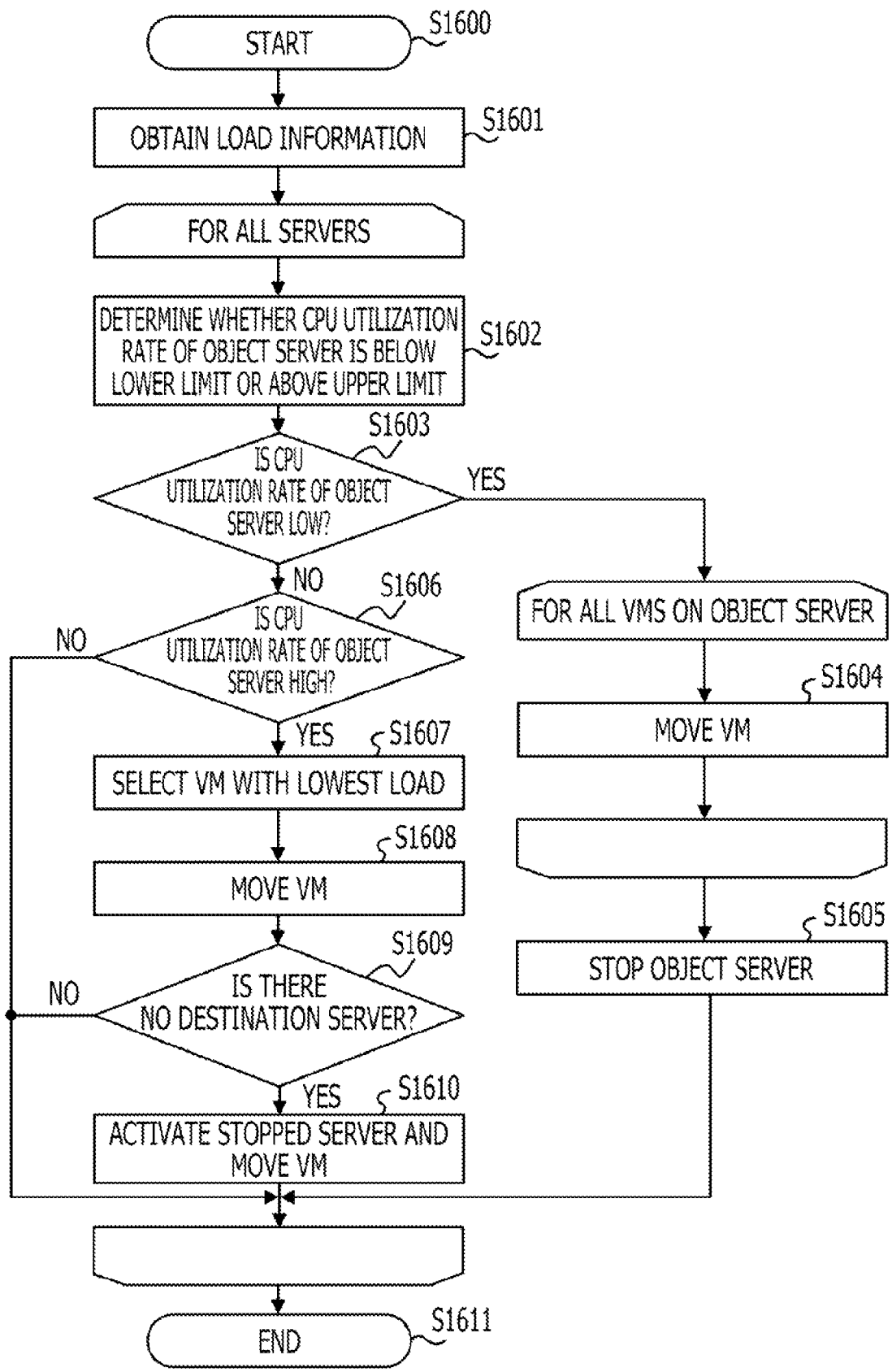
FIG. 16 illustrates an outline of the control server processing according to the second embodiment.

FIG. 16 illustrates an outline of the control server 610 processing according to the present embodiment. The control server 610 may conduct the load monitoring and control processing illustrated in FIG. 16 at certain intervals or when needed. When an instruction to conduct the load monitoring and control processing is received, the control server 610 starts the processing (step S1600).

In step S1601, the control server 610 obtains load information from each server, for example, from the servers 620, 630, and 640 illustrated in FIG. 6. In other words, the control server 610 obtains the CPU load information and the VM load information as described in FIG. 15. The control server 610 then stores the obtained CPU load information in the server table 800, and stores the obtained VM load information in the VM table 900.

The processing in step S1701 may not be necessary. For example, the processing in step S1701 may be substituted with the processing conducted in step S1601 in FIG. 16.

After the step S1601 is completed, all the servers are subject to the following processing for the steps S1602 to S1610 conducted by the control server 610. The control server 610 selects one server from the servers registered in the server table 800 and the processing advances to step S1602. In the following description, the selected server shall be referred to as the "object server."

In step S1602, the control server 610 refers to the server table 800 to obtain the CPU utilization rate of the object server. The control server 610 then determines whether the CPU utilization rate of the object server is below the lower limit of the utilization range. Similarly, the control server 610 then determines whether the CPU utilization rate of the object server is above the upper limit of the utilization range.

If the CPU utilization rate of the object server is below the lower limit of the utilization range (S1603 Yes), the control server 610 determines that the CPU utilization rate of the object server is low in step S1603 and then the processing advances to step S1604. In step S1604, the control server 610 moves all the VMs operating on the object server to another server or servers.

After moving all the VMs on the object server, the control server 610 advances to step S1605. In step S1605, the control server 610 then stops the object server that has no operating VMs.

If there is a server that has not received the processing from steps S1602 to S1610 among the servers registered in the server table 800, the control server 610 selects a new object server from the servers registered in the server table 800. The control server 610 then proceeds to step S1602.

In step S1603 on the other hand, if the CPU utilization rate of the object server is equal to or greater than the lower limit of the utilization range (step S1603 No), the control server 610 determines that the load of the object server is not low and the processing advances to step S1606.

If the CPU utilization rate of the object server is equal to or below the upper limit of the utilization range (S1606 No), the control server 610 determines that the CPU utilization rate of the object server is not high in step S1606. If there is a server that has not received the processing from steps S1602 to S1610 among the servers registered in the server table 800, the control server 610 selects a new object server from the servers registered in the server table 800. The control server 610 then proceeds to step S1602.

If the CPU utilization rate of the object server is above the upper limit of the utilization range (S1606 Yes), the control server 610 determines that the CPU utilization rate of the object server is high and then the processing advances to step S1607.

In step S1607, the control server 610 selects the VM with the lowest load among the VMs operating on the object server. For example, the control server 610 refers to the VM table 900 to select the VM with the lowest CPU utilization rate among the VMs operating on the object server.

In step S1608, the control server 610 moves the VM selected in step S1607 to another server.

In step S1609, if there is no destination server, e.g., the processing in step S1608 cannot be done since there is no destination server for the VM, (step S1609 Yes), the control server 610 processing advances to step S1610. In step S1610, the control server 610 activates a stopped server. After activating the server, the control server 610 then moves the VM to the activated server.

If there is a server that has not received the processing from steps S1602 to S1610 among the servers registered in the server table 800, the control server 610 selects a new object server from the servers registered in the server table 800. The control server 610 then proceeds to step S1602.

Moreover, after conducting the steps S1602 to S1610 for all the servers registered in the server table 800, the control server 610 advances to step S1611 to end the load monitoring and control processing.

Figure 17:
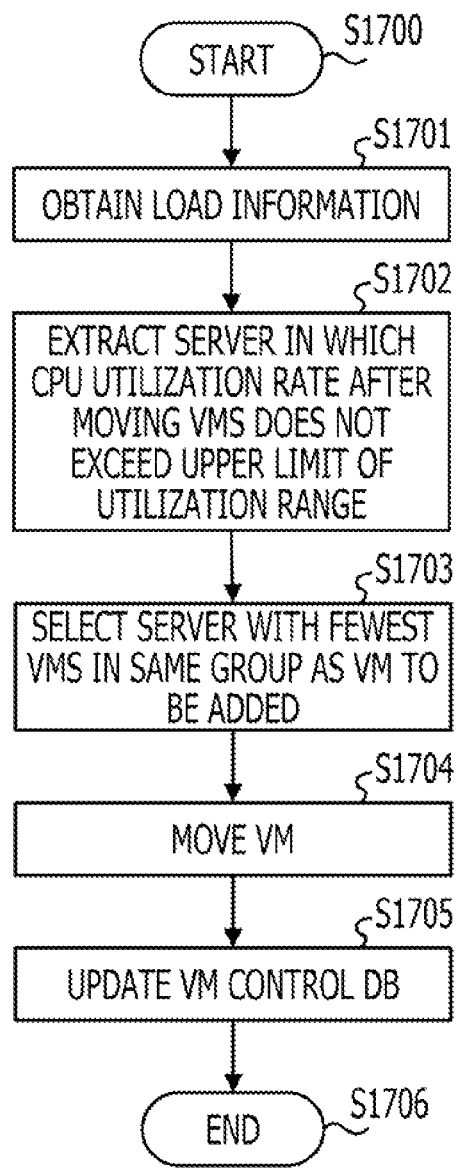
FIG. 17 is a flow chart illustrating VM moving processing according to the second embodiment.

FIG. 17 is a flow chart illustrating VM moving processing according to the present embodiment.

After conducting the processing in steps S1604 or S1608 illustrated in FIG. 16, the control server 610 starts the processing to move the VM as described below (step S1700).

In step S1701, the control server 610 obtains load information from each server, for example, from the servers 620, 630, and 640 illustrated in FIG. 6. In other words, the control server 610 obtains the CPU load information and the VM load information as described in FIG. 15. The control server 610 then stores the obtained CPU load information in the server table 800. The control server 610 also stores the obtained VM load information in the VM table 900.

In step S1702, the control server 610 refers to the server table 800 to extract a server with a CPU utilization rate that does not exceed the upper limit of the CPU utilization range after moving the VM. The extracted server then becomes a candidate server to receive the VM.

Using the case of moving the VM 4 operating on the server 2 as an example, the CPU utilization rate of the server after moving the VM can be derived as follows.

(1) The control server 610 refers to the VM table 1100 to obtain the CPU utilization amount (0.7 GHz) of the VM 4 to be moved.

(2) The control server 610 refers to the server table 1200 to obtain the CPU utilization amount (1.8 GHz) of the server 1.

(3) The control server 610 adds the CPU utilization amount (0.7 GHz) of the VM 4 and the CPU utilization amount (1.8 GHz) of the server 1 to obtain the sum 2.5 GHz. The control server 610 then obtains the CPU utilization rate (83.3%) of the server 1 when the VM 4 is moved to the server 1 from the following equation (2).

$$\text{CPU utilization rate} = \text{CPU utilization amount} \div \text{CPU performance} \times 100 \qquad (2)$$

(4) Similarly, the control server 610 calculates the CPU utilization rate (70.0%) of the server 3 when the VM 4 is moved to the server 3, and the CPU utilization rate (56.7%) of the server 4 when the VM 4 is moved to the server 4.

In the above case, the control server 610 extracts the servers 3 and 4 whose CPU utilization rates are within the utilization range after moving the VM 4 as VM destination server candidates.

In step S1703, the control server 610 refers to the VM table 900 to select the server with the fewest VMs in the same group as the VM to be moved from among the servers extracted in step S1702.

For example, if the VM 4 illustrated in FIG. 11 is to be moved, the control server 610 selects a server with the fewest VMs belonging to the operation C group to which the VM 4 belongs. Referring to VM table 1100, the server 3 is the only server in which the VM 6 belonging to the operation C group is operating among the server 3 and server 4 that have a CPU utilization rate within the utilization range after the VM 4 is moved. Conversely, there is no VM belonging to the operation C group running on the server 4. In this case, the control server 610 selects the server 4.

In step S1704, the control server 610 moves the VM to the server selected in step S1703. For example, the control server 610 instructs the object server in which the VM to be moved is operating and the server selected in step S1703 to move the VM. As a result, the VM is moved between the servers that received the instructions.

In step S1705, the control server 610 updates the VM control DB 614. For example, if the VM 4 is moved from the server 2 to the server 4, the control server 610 updates the server table 800 and the VM table 900 stored in the VM control DB 614 so that the tables become the VM table 1300 illustrated in FIG. 13 and the server table 1400 illustrated in FIG. 14, respectively.

Figure 18:
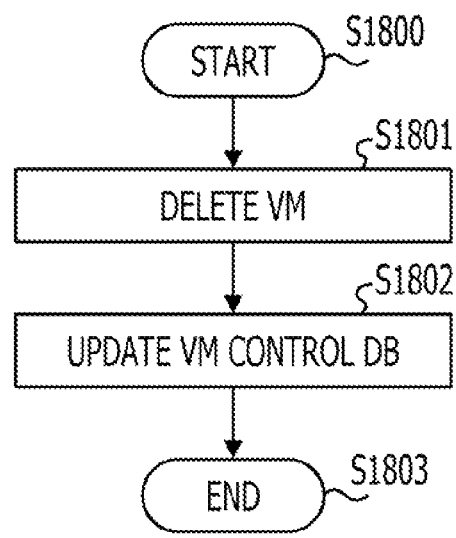
FIG. 18 is a flow chart illustrating VM deletion processing according to the second embodiment.

FIG. 18 is a flow chart illustrating VM deletion processing according to the present embodiment.

Upon receiving an instruction to delete a VM from a user, the control server 610 starts the VM deletion processing as described below (step S1800).

In step S1801, the control server 610 instructs the server selected by the user to delete a VM. Upon receiving notification that the VM was deleted from the instructed server, the control server 610 then advances to step S1802. In step S1802, the control server 610 then updates the VM control DB 614. For example, the control server 610 deletes the information about the deleted VM from the VM table 900 stored in the VM control DB 614. The control server 610 then ends the VM deletion processing (step S1803).

Figure 19:
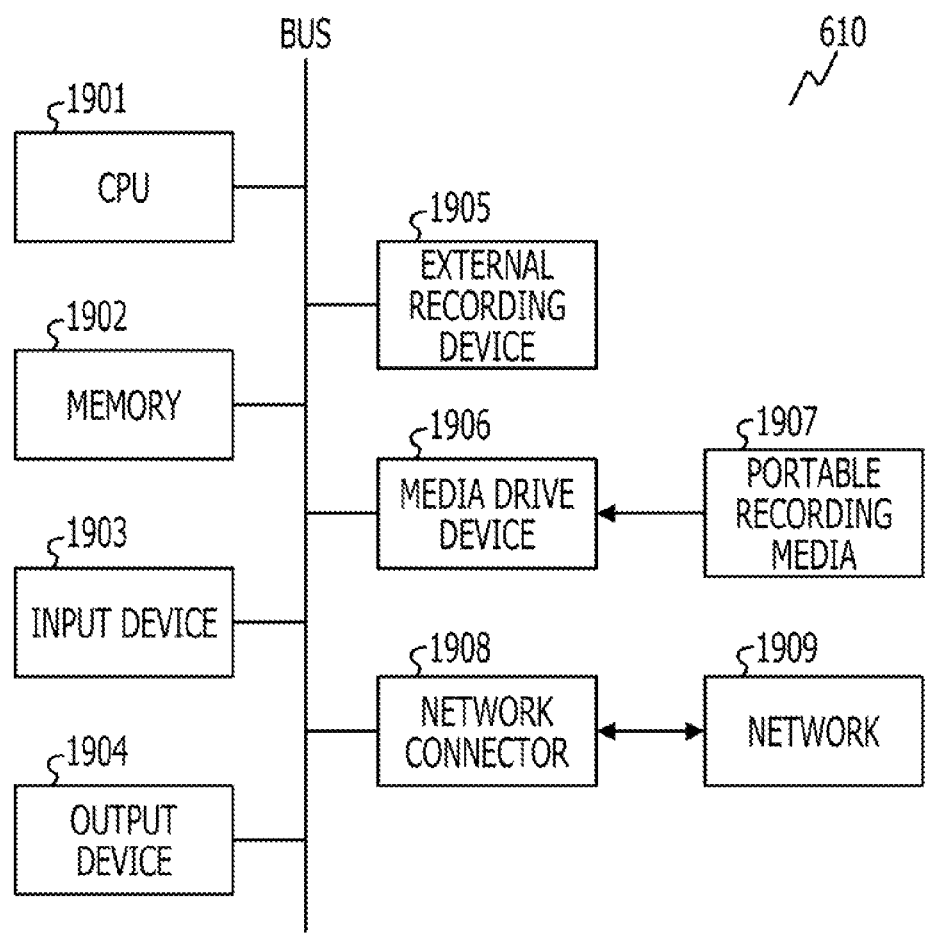
FIG. 19 illustrates an exemplary configuration of a control server according to the second embodiment.

FIG. 19 illustrates an exemplary configuration of the control server 610 according to the present embodiment.

The control server 610 illustrated in FIG. 19 includes a CPU 1901, a memory 1902, an input device 1903, an output device 1904, an external recording device 1905, a media drive device 1906, and a network connector 1908. The above devices are interconnected by a bus to transfer data between each other.

The CPU 1901 is a computing device that executes programs to implement peripheral devices and various types of software as well as implement the load monitoring and control processing according to the present embodiment.

The memory 1902 is a volatile storage device used when executing the programs. A RAM (Random Access Memory) may be used, for example, as the memory 1902.

The input device 1903 includes means to input data from outside. For example, a keyboard and/or a mouse may be used as the input device 1903.

The output device 1904 is a device to display data and the like on display devices and the like. The output device 1904 may also include a display device.

The external recording device 1905 is a non-volatile storage device that records programs and data operated by the control server 610 as well as programs that implement the load monitoring and control processing according to the present embodiment. Moreover, a part of or all of the external recording device 1905 may be used as the VM control DB 614. A magnetic disk storage device and the like may be used, for example, as the external recording device 1905.

The media drive device 1906 inputs data of the memory 1902 and the external recording device 1905 in a portable recording medium 1907 such as, for example, a floppy disk, an MO disk, a CD-R, or a DVD-R. The media drive device 1906 also reads programs and data and the like from the portable recording medium 1907.

The network connector 1908 is a device connected to a network 1909.

The memory 1902, the external recording device 1905, and the portable recording medium 1907 media are non-transitory media that can be read by the information processor.

Furthermore, the entire configuration illustrated in FIG. 19 is not intended to indicate that the control server 610 requires such a configuration. A part or the entire configuration illustrated in FIG. 19 may be used and other constituent elements not indicated in FIG. 19 may also be included.

Figure 20:
FIG. 20 illustrates a VM table when VMs use connected networks according to VM group classifications.

FIG. 20 illustrates a VM table 2000 when VMs use connected networks according to VM group classifications.

The example in FIG. 20 illustrates a case in which the VM 1, the VM 5, and the VM 7 form a group connected to a network Net1. Similarly, the VM 2 and the VM 3 form a group connected to a network Net2, and the VM 4 and the VM 6 form a group connected to the network Net3.

FIG. 21 illustrates a VM table 2100 when users who use the VMs are used according to VM group classifications.

The example in FIG. 21 illustrates a case in which the VM 1, the VM 5, and the VM 7 form a group being used by a user A. Similarly, the VM 2 and the VM 3 form a group being used by a user B, and the VM 4 and the VM 6 form a group being used by a user C.

As described above, when a VM is added or moved, the control server 610 selects a server with the fewest number of VMs having the same attributes as the VM to be added or moved. The control server 610 then causes the VM to be added or moved to the selected server.

When the number of VMs with the same attributes is small, VMs with the same or similar trends in fluctuations of the information processing load are fewer. As a result, an increase in the load of many VMs at the same time causing the load on the server to increase dramatically can be avoided. Hence, a decrease of the resources that can be used by VMs when the utilization amount of resources used by some VMs increases due to increases in loads can be avoided. Thus, since the allocated resources can be used without limitations, the virtual machines can demonstrate performance comparable to the allocated resources.

Moreover, increases in the loads on multiple VMs at the same time operating on the same server can be avoided by distributing and deploying VMs with the same or similar trends in load fluctuations. As a result, the amount of resources used by the VMs can be stabilized and the frequency of VM migration can be reduced. Moreover, costs associated with migration can be reduced.

Costs here include, for example, loads on servers when conducting the processing necessary for migration, or increases in utilization rates of networks, CPUs, and memories and the like. Further, costs also include maintenance costs for conducting maintenance for migration and the like.

Furthermore, the control server 610 distributes VMs having the same attributes for the same or similar trends in load fluctuations by adding VMs or moving VMs to servers. As a result, a user can easily control the loads of the information processors 620 to 640 in the information processing system 600 by, for example, adding or moving VMs to the information processors 620 to 640.

The frequency of activating servers to be used as destinations or for adding VMs thereto is reduced since the frequency of VM migration can be reduced. Therefore, states in which the required resources cannot be assured and a comparable performance among resources allocated to VMs cannot be demonstrated can be avoided since migration cannot be conducted until the server activation is completed.

Moreover, the control server 610 extracts a server with a CPU utilization rate that does not exceed the upper limit of the utilization range to add a VM thereto (step S1503). As a result, the control server 610 can add VMs so that the CPU utilization rates of the servers included in the information processing system 600 do not exceed the upper limit of the utilization range.

Moreover, the control server 610 extracts a server with a CPU utilization rate that will not exceed the upper limit of the utilization range after moving the VM, to add a VM thereto (step S1702). As a result, the control server 610 can move VMs so that the CPU utilization rates of the servers included in the information processing system 600 do not exceed the upper limit of the utilization range.

Moreover, when a server with a CPU utilization rate below the lower limit of the utilization range is detected, the control server 610 moves all the VMs on the detected server to other servers and then stops the server that has had the VMs removed therefrom (steps S1603 to S1605). As a result, the control server 610 can raise the working efficiency of the servers and reduce costs.

Moreover, when a server with a CPU utilization rate above the upper limit of the utilization range is detected, the control server 610 moves the VMs on the detected server to other servers (steps S1606 to S1608). As a result, the control server 610 can reduce the CPU utilization rates of the servers included in the information processing system 600 to a level below the upper limit of the utilization range.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A non-transitory computer-readable recording medium storing a program that causes a computer to execute a process to deploy a virtual machine among a plurality of information processing devices including a first information processing device and a second information processing device, the process comprising:
    referring to each attribute information of one or more first virtual machines being provided by the first information processing device and each attribute information of one or more second virtual machines being provided by the second information processing device, the attribute information indicating identification of an operation which a virtual machine is used; and
    deploying a deployment object virtual machine to the first information processing device when the number of first virtual machines with an attribute information that are the same as the attribute information of the deployment object virtual machine among one or more first virtual machines is detected to be fewer than the number of second virtual machines with the attribute information that are the same as the attribute information of the deployment object virtual machine among the second virtual machines, wherein
    when a load based on load information indicating a load of the first information processing device is lower than a second criteria, all the first virtual machines being provided by the first information processing device are moved to a third information processing device other than the first information processing device.

2. The non-transitory computer-readable recording medium according to claim 1, wherein:
    the attribute information includes an attribute indicating a same or a similar trend in a fluctuation of loads on the first or second information processing devices.

3. The non-transitory computer-readable recording medium according to claim 1, wherein:
    the first and the second information processing devices have loads based on load information indicating loads of the first and the second information processing devices that are lower than a first criteria.

4. The non-transitory computer-readable recording medium according to claim 3, wherein:
    the load information is a utilization rate of any one of a computing device and a storage device in the first and the second information processing devices.

5. The non-transitory computer-readable recording medium according to claim 1, wherein:
    the first and the second information processing devices have loads based on load information indicating a load after receiving deployment of the deployment object virtual machine that are lower than a first criteria.

6. The non-transitory computer-readable recording medium according to claim 1, wherein:
    after moving all the first virtual machines being provided by the first information processing device, the first information processing device is stopped, and
    after moving all the second virtual machines being provided by the second information processing device, the second information processing device is stopped.

7. The non-transitory computer-readable recording medium according to claim 1, wherein:
    when a load based on load information indicating a load of the first information processing device is higher than a first criteria, the first virtual machine being provided by the first information processing device is moved to a third information processing device other than the first information processing device.

8. The non-transitory computer-readable recording medium according to claim 7, wherein:
    when the third information processing device does not exist, a fourth information processing device is activated and the first virtual machine being provided by the first information processing device is moved to the fourth information processing device.

9. The non-transitory computer-readable recording medium according to claim 1, wherein:
    the attribute information includes any one of a network connected to the first or second virtual machine, a user using the first or second virtual machine, and a purpose of usage of the first or second virtual machine as an attribute.

10. A method to deploy a virtual machine among a plurality of information processing devices including a first information processing device and a second information processing device, the method comprising:
    referring to each attribute information of one or more first virtual machines being provided by the first information processing device and each attribute information of one or more second virtual machines being provided by the second information processing device, the attribute information indicating identification of an operation which a virtual machine is used; and
    deploying a deployment object virtual machine to the first information processing device when the number of the first virtual machines with an attribute information that are the same as the attribute information of the deployment object virtual machine among one or more first virtual machines being provided by the first information processing device is detected to be fewer than the number of second virtual machines with the attribute information that are the same as the attribute information of the deployment object virtual machine among the second virtual machines being provided by the second information processing device, wherein
    when a load based on load information indicating a load of the first information processing device is lower than a second criteria, all the first virtual machines being provided by the first information processing device are moved to a third information processing device other than the first information processing device.

11. The method according to claim 10, wherein the attribute information includes an attribute indicating a same or a similar trend in a fluctuation of loads on the first or second information processing devices.

12. The method according to claim 10, wherein the first and the second information processing devices have loads based on load information indicating loads of the first and the second information processing devices that are lower than a first criteria.

13. The method according to claim 10, wherein the first and the second information processing devices have loads based on load information indicating a load after receiving deployment of the deployment object virtual machine that are lower than a first criteria.

14. The method according to claim 10, wherein the plurality of information processing devices further includes a third information processing device,
the method further comprising:
moving all the first virtual machines being provided by the first information processing device to the third information processing device when a load based on load information indicating a load of the first information processing device is lower than a second criteria.

15. The method according to claim 14, further comprising:
stopping the first information processing device after the moving;
moving all the second virtual machines being provided by the second information processing device; and
stopping the second information processing device after the moving of all the second virtual machines.

16. The method according to claim 10, wherein the plurality of information processing devices further includes a third information processing device,
the method further comprising:
moving the first virtual machine being provided by the first information processing device to the third information processing device when a load based on load information indicating a load of the first information processing device is higher than a first criteria.

17. The method according to claim 16, wherein the plurality of information processing devices further includes a fourth information processing device,
the method further comprising:
activating the fourth information processing device when the third information processing device does not exist; and
moving the first virtual machine being provided by the first information processing device to the fourth information processing device.

18. A control device comprising:
a memory; and
a processor coupled to the memory and configured to deploy a deployment object virtual machine to the first information processing device when the number of the first virtual machines with attribute information that are the same as the attributes of the deployment object virtual machine among the first virtual machines being provided by the first information processing device is detected to be fewer than the number of second virtual machines with attribute information that are the same as the attribute information of the deployment object virtual machine among the second virtual machines being provided by the second information processing device based on each attribute information of one or more first virtual machines being provided by the first information processing device and each attribute information of one or more second virtual machines being provided by the second information processing device, the attribute information indicating identification of an operation which a virtual machine is used, wherein
when a load based on load information indicating a load of the first information processing device is lower than a second criteria, all the first virtual machines being provided by the first information processing device are moved to a third information processing device other than the first information processing device.

* * * * *